US009547724B2

(12) United States Patent
Claux et al.

(10) Patent No.: US 9,547,724 B2
(45) Date of Patent: *Jan. 17, 2017

(54) PROVIDING RULE BASED ANALYSIS OF CONTENT TO MANAGE ACTIVATION OF WEB EXTENSION

(71) Applicant: Microsoft Technology Licensing, LLC, Redmond, WA (US)

(72) Inventors: David Claux, Redmond, WA (US); Andrew Salamatov, Redmond, WA (US); Oleg Ouliankine, Redmond, WA (US); Warren Byrne, Esparto, CA (US); Carlos Brito, Sammamish, WA (US); Jason Henderson, Tacoma, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,551

(22) Filed: Jul. 14, 2015

(65) Prior Publication Data

US 2016/0124979 A1    May 5, 2016

Related U.S. Application Data

(63) Continuation of application No. 13/679,175, filed on Nov. 16, 2012, now Pat. No. 9,092,728.

(51) Int. Cl.
G06F 15/18    (2006.01)
G06F 17/30    (2006.01)
(Continued)

(52) U.S. Cl.
CPC ....... G06F 17/3089 (2013.01); G06F 17/2705 (2013.01); G06F 17/30864 (2013.01);
(Continued)

(58) Field of Classification Search
CPC .................................................. G06F 17/30864
(Continued)

(56) References Cited

U.S. PATENT DOCUMENTS 7,634,720 B2    12/2009    Haluptzok et al.
7,765,097 B1    7/2010    Yu et al.
(Continued)

OTHER PUBLICATIONS

"Using regular expressions to show a mail app in Outlook", Retrieved at <<http://msdn.microsoft.com/en-us/library/fp142135(v=office.15).aspx>>, Jul. 16, 2012, pp. 7.
(Continued)

*Primary Examiner* — David Vincent
(74) *Attorney, Agent, or Firm* — Anand Gupta; Tom Wong; Micky Minhas (57) ABSTRACT

A rule based analysis of content is provided to manage activation of a web extension. A user interaction with the content launches a process to match a rule from the manifest to a portion of the content. The rule and the detected content are loaded into memory. The content is processed using the rule and by accessing the memory containing the content to determine a match. An application may choose to process the content using the rules on a background thread to avoid impacting user's experience. An activation control is displayed for the web extension associated with the rule within a web extension pane upon matching the rule to an item in the content.

20 Claims, 7 Drawing Sheets

(51) Int. Cl.
*G06N 5/02* (2006.01)
*H04L 29/08* (2006.01)
*G06F 17/27* (2006.01)

(52) U.S. Cl.
CPC ......... *G06F 17/30896* (2013.01); *G06N 5/02* (2013.01); *H04L 67/02* (2013.01)

(58) Field of Classification Search
USPC .................................................... 706/12, 45
See application file for complete search history.

(56) References Cited

U.S. PATENT DOCUMENTS

| | | |
|---|---|---|
| 7,769,899 B2 | 8/2010 | Grabarnik et al. |
| 2005/0027723 A1 | 2/2005 | Jones et al. |
| 2006/0195816 A1 | 8/2006 | Grandcolas et al. |
| 2007/0204223 A1 | 8/2007 | Bartels et al. |
| 2007/0256003 A1 | 11/2007 | Wagoner et al. |
| 2008/0059463 A1 | 3/2008 | Bauchot et al. |
| 2010/0131529 A1 | 5/2010 | Kasera et al. |
| 2010/0229150 A1 | 9/2010 | Stone et al. |
| 2010/0257182 A1 | 10/2010 | Saliba et al. |
| 2011/0289162 A1 | 11/2011 | Furlong et al. |

OTHER PUBLICATIONS

Jakobo, "Alternate manifest using regexes to drive it", Retrieved at <<https://github.com/linkedin/inject/issues/23>>, Retrieved Date: Aug. 28, 2012, pp. 7.
"Fundamentals for developing mail apps in Outlook", Retrieved at <<http://msdn.microsoft.com/en-us/library/fp161015 (v=office.15). aspx>>, Aug. 16, 2012, pp. 7.
Wang, Towards a Rule Model for Self-adaptive Software, Jan. 2005, ACM Sigsoft Software Engineering Notes, pp. 1-5.
"Non-Final Office Action Issued in U.S. Appl. No. 13/679,175", Mailed Date: Dec. 3, 2014, 13 Pages.
"Notice of Allowance Issued in U.S. Appl. No. 13/679,175", Mailed Date: Mar. 16, 2015, 5 Pages.
Adams, DJ, "Getting started with Gmail Contextual Gadgets", Available at: <<http://www.pipetree.com/qmacro/blog/2010/06/getting-started-with-gmail-contextual-gadgets/>>, Published on: Jun. 21, 2010, 8 Pages.
"International Preliminary Report on Patentability Issued in PCT Application No. PCT/US2013/036517", Mailed Date: Oct. 30, 2014, 8 Pages.
"International Search Report and Written Opinion Issued in PCT Application No. PCT/US2013/036517", Mailed Date: Jul. 19, 2013, 11 Pages.

PROVIDING RULE BASED ANALYSIS OF CONTENT TO MANAGE ACTIVATION OF WEB EXTENSION

CROSS REFERENCE TO RELATED APPLICATIONS

This Application is a continuation under 35 U.S.C. §120 of co-pending U.S. patent application Ser. No. 13/679,175, filed on Nov. 16, 2012, which, in turn, claims priority under 35 U.S.C. §119(e) to U.S. Provisional Patent Application Ser. No. 61/635,398, filed on Apr. 19, 2012. The disclosures of the U.S. Patent Application and the U.S. Provisional Patent Application are hereby incorporated by reference in their entirety.

BACKGROUND

Data analysis is an integral part of modern services provided by software. Analysis services span a vast array of information mining and mapping. Analysis systems receive content from variety of resources including business and social networking systems. User information is also gathered and collected from ever expanding array of personal devices. User generated content is stored and managed by expansive systems providing interactive services with the stored information. The ever expanding amount of information generated by systems and users are processed by analysis systems to produce patterns, predictions, etc. Analysis results are utilized by other systems relying on the results to generate reports, evaluate user performance, determine recommendations, etc.

Expansion of legacy software functionality is an ever present customer demand. Expanding existing software functionality is a project with varying levels of complexity. Any software needing adjustment to the source code and subsequent redeployment will incur significant cost to the customer and the developer. Alternatively, external tools can be integrated into existing software to provide additional functionality. Such integration usually involves minimal alterations to the existing software. Integration can involve adjusting a simple input and output routine of the deployed solution. External tools can integrate analysis functionality into legacy software. The provided analysis functionality enhances the features of the software. Feature integration boosts a service ceiling of a legacy system and saves the customer from time and cost associated with deploying a new solution.

SUMMARY

This summary is provided to introduce a selection of concepts in a simplified form that are further described below hi the Detailed Description. This summary is not intended to exclusively identify key features or essential features of the claimed subject matter, nor is it intended as an aid in determining the scope of the claimed subject matter.

Embodiments are directed to providing a rule based analysis of content to manage activation of a web extension. According to some embodiments, an application may retrieve a rule from a manifest of a web extension. The manifest may contain one or more rules formatted in a structured format such as extensible markup language (XML). Next, the rule and content from a source may be loaded into memory. The source may be a content generator such as an email server. After the memory write, the content may be processed using the rule to determine a match. Upon determining the match, an activation control for the web extension may be displayed within a web extension pane.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, activation of a web extension may be managed according to a rule based analysis of content. A rule retrieved from a manifest of a web extension and content from a source may be loaded into memory. The content may be processed using the rule to determine a match. An activation control for the web extension may be displayed within a web extension pane upon determining the match. A web extension as used herein refers to a productivity or similar application provided by a hosted service. For example, a mail application provided by a hosted communication service. Other types of applications may also be employed as a web extension in configurations according to embodiments.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implement-ed via one or more of a volatile computer memory, a non-volatile memory, a hard drive, a flash drive, a floppy disk, or a compact disk, and comparable media.

Throughout this specification, the term "platform" may be a combination of software and hardware components for providing a rule based analysis of content to manage activation of a web extension. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
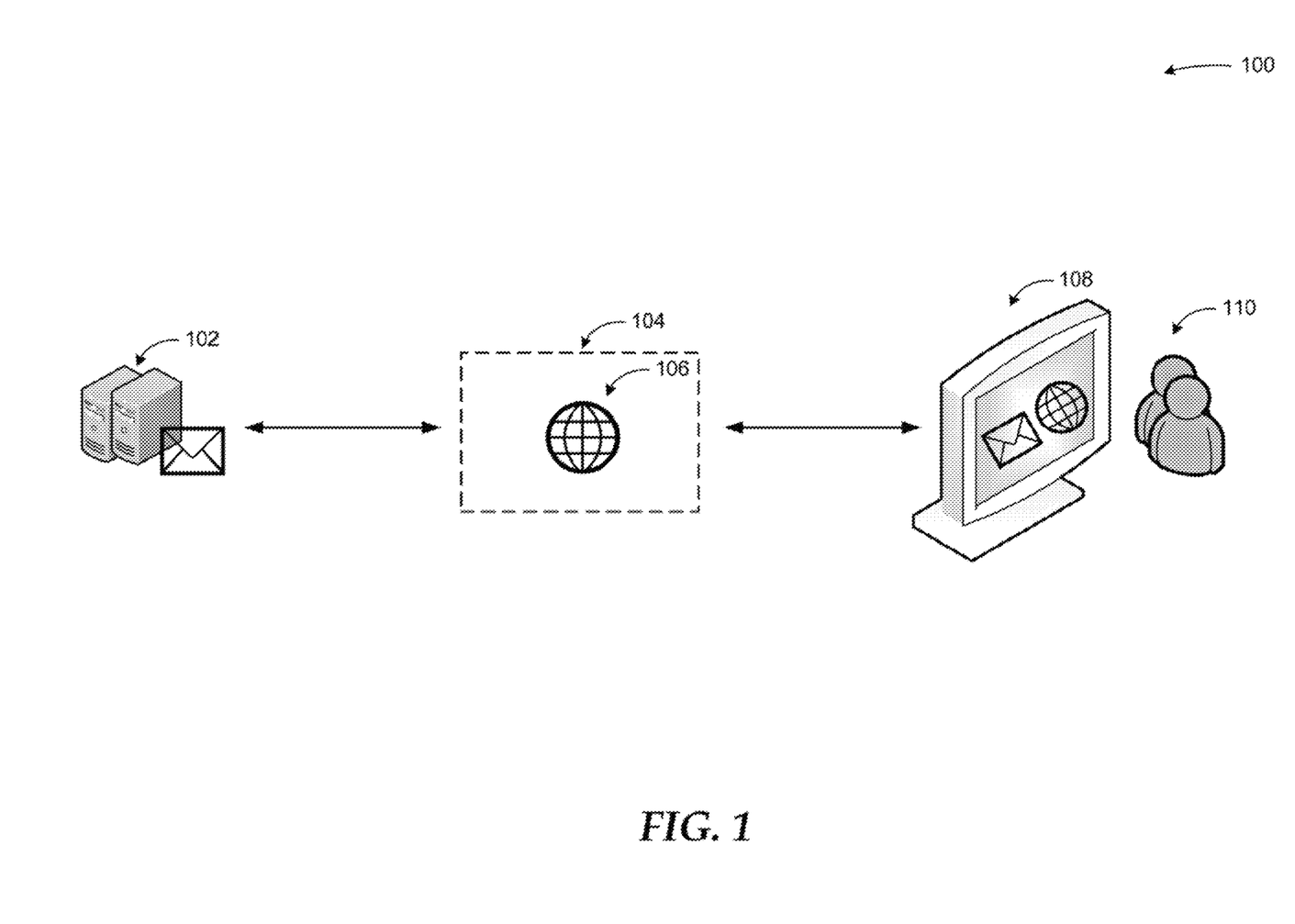
FIG. 1 illustrates an example architecture diagram where an application may provide a rule based analysis of content to manage activation of a web extension according to some embodiments.

FIG. 1 illustrates an example architecture diagram where an application may provide a rule based analysis of content to manage activation of a web extension. The components and environments shown in diagram 100 are for illustration purposes. Embodiments may be implemented in various local, networked, cloud-based and similar computing environments employing a variety of computing devices and systems, hardware and software.

An example server 102 may host content. The content may include a variety of media, including but not exclusive to textual, graphical, audio, video, etc. The content may also include media composed of combination of other media, for example an email message and a web site. The content may be consumed by variety of clients including user device 108.

The content may be processed with a rule from a manifest of a web extension 106. The content may be analyzed on the client 108. In an example scenario, the client application 108 may start processing content such an email message with a rule from the manifest of web extension 106. If a match is determined within the content, the web extension associated with the rule may be displayed within a web extension user interface (UI). The web extension UI may display a control in proximity to the displayed web extension to enable a user 110 to activate the web extension through device 108.

Embodiments are not limited to implementation in a client-server type architecture. Activation of a web extension may be managed by an application executed in a peer-to-peer, distributed, cloud based, and combination type architecture. In an example scenario, an application may process the content using the rule entirely in the display device 108.

Figure 2:
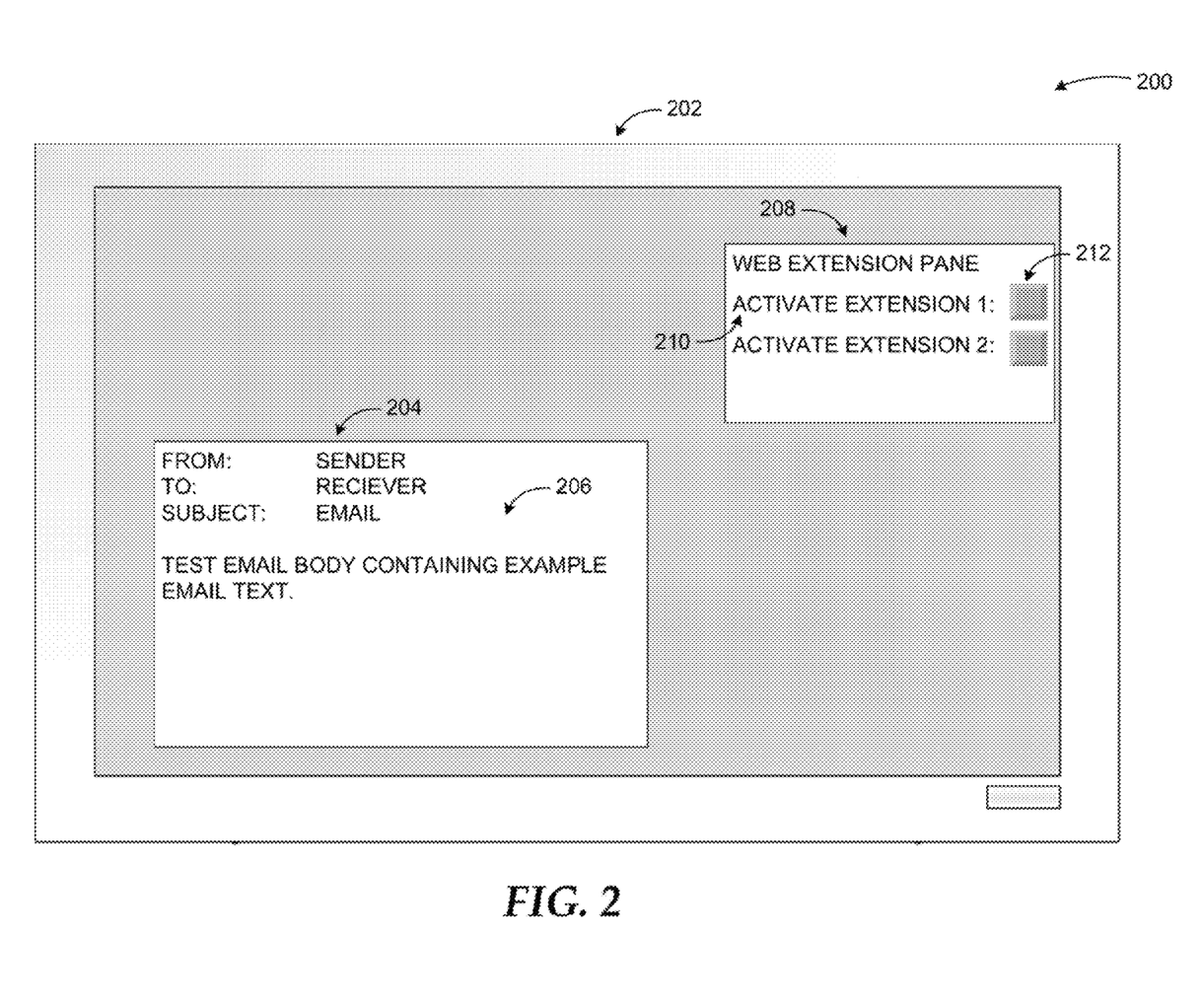
FIG. 2 illustrates an example display showing a web extension pane and a content pane according to embodiments.

FIG. 2 illustrates an example display showing a web extension pane and a content pane according to embodiments. Diagram 200 displays a web extension UI to control activation of the web extension.

Display device 202 may display the content to a user through a content pane 204. An application according to embodiments may utilize a rule retrieved from a manifest of a web extension to process the content 206. The manifest may be an XML formatted file containing one or more rules. The manifest may be stored in a cache. The cache may be a memory based or a disk based cache. In addition to the manifest, a web extension may include descriptive text formatted in hypertext markup language (html), and a script to perform an action.

A rule may be a regular expression rule which may describe a pattern within the content. In an example scenario, a regular expression rule may match an item such as a subject, a recipient, a selection from the body of content such as an email message. The item may be a portion of the content. In addition, a web expression developer may have access to the manifest and may be enabled to alter existing rules within the manifest. The developer may also have privileges to create new manifests containing new rules and attach the new rules to a web extension. The developer may also be enabled to delete existing manifests and unlink rules attached to a web extension.

The rule in the manifest may be loaded to memory by an application according to embodiment. Content may also be loaded to memory upon detection. For example, content may be detected when a user selects an item within the content. An example may be a user selecting an email address within an email message. Content may also be detected when the content is displayed by a user action. The user action to display the content may initiate the application to upload the content to memory.

Detected content may initiate the rule based analysis. A rule engine may process the content in the memory using the rule and by accessing the memory where the content was loaded to. If the rule matches an item in the content, the application may display an identifier 210 for an associated web extension in a web extension UI such as the web extension pane 208. A control 212 to activate the associated web extension may also be displayed adjacent to the identifier 210 for the associated web extension.

Figure 3A:
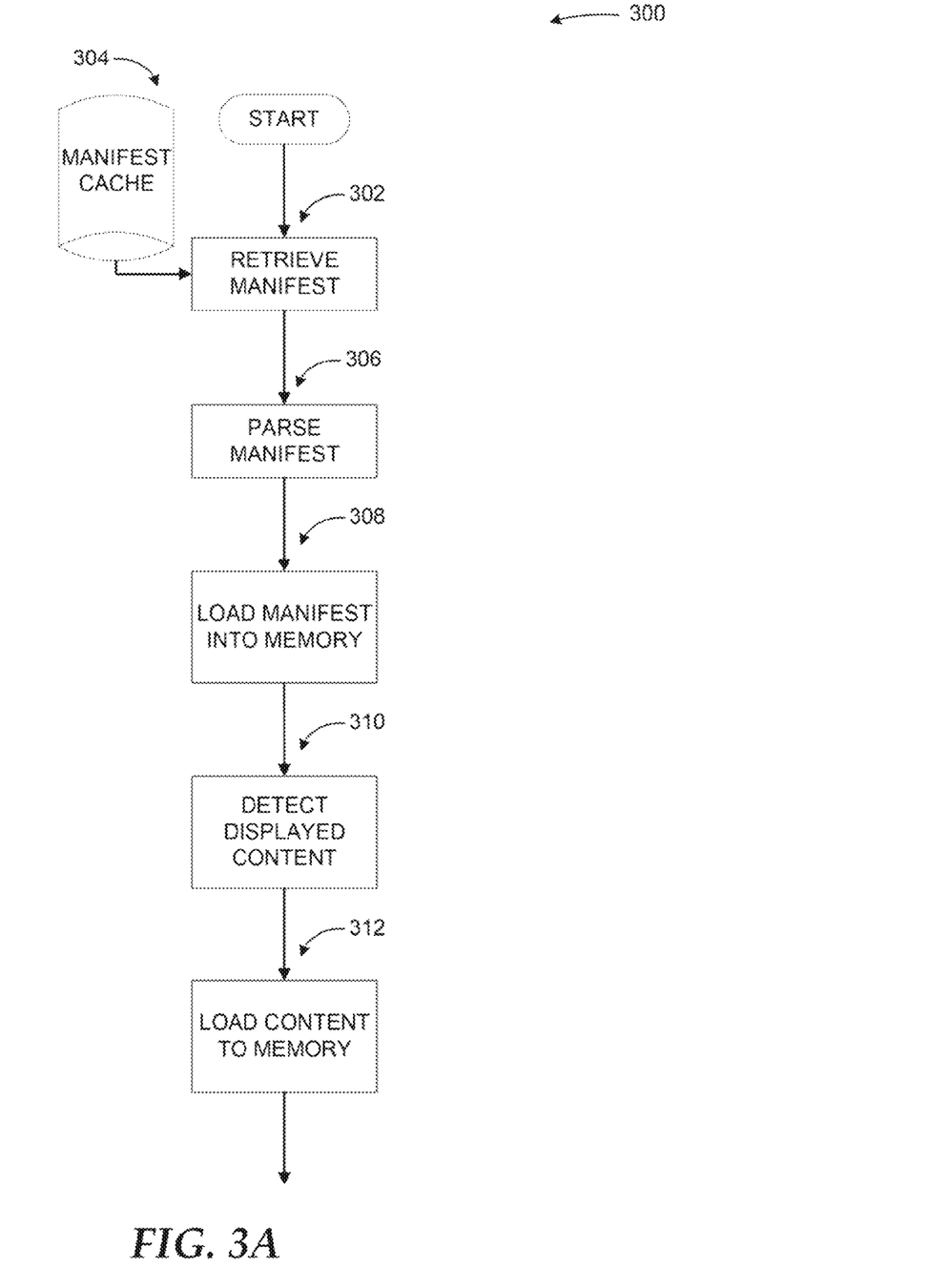
FIGS. 3A and 3B illustrate a flow diagram implementing an example embodiment.
Figure 3B:
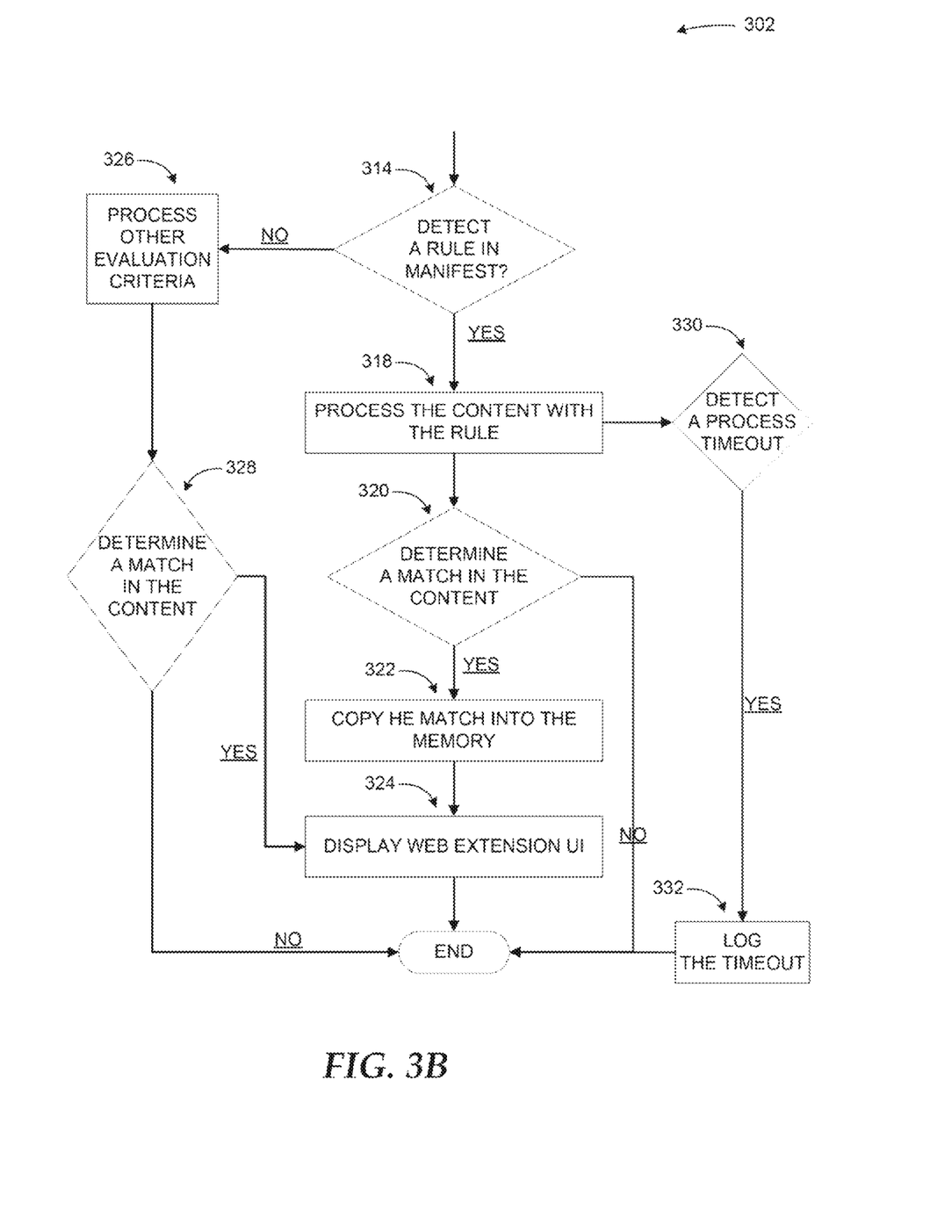

FIGS. 3A and 3B illustrate a flow diagram implementing an example embodiment. Diagrams 300 and 302 display an example process to provide rule based analysis of content to manage activation of a web extension.

An application, according to embodiments, may retrieve a manifest 302 from cache 304. The manifest may be formatted using extensible markup language (XML). The manifest may contain one or more rules of a web extension. An example rule may be a regular expression rule to recognize a pattern in content. The pattern may match an item in the content. Next, the application may parse the manifest 306. Parsing may involve recognizing a rule formatted in XML and translating the XML formatted rule into one or more conditions. In an example scenario, a rule such as a regular expression rule may define conditions to match an item in the content. Conditions may include length of the item, substance of the item (e.g.: alphanumeric characters), a matching frequency value including a lower and an upper boundary values to match items within the content, etc. Upon parsing the manifest, the application may load the manifest into memory 308. The manifest may also contain entities to manage other evaluation criteria. The manifest may contain rules and the other evaluation criteria. Alternatively, the manifest may only contain other evaluation criteria.

A user action may display content in a user device. The application may detect the displayed content 310. Upon detecting the content, the content may be loaded into memory 312 for future processing. If a rule engine component of the application detects a rule within the manifest 314, the rule engine may process the content in the memory with the rule in the memory 318. The rule engine may be executed on a background thread to minimize the impact to the user's experience.

If the rule engine does not detect a rule within the manifest, the content may be processed with other evaluation criteria 326. Other evaluation criteria may be specified in the manifest and loaded into memory. If the application determines a match in the content 328 using the other evaluation criteria, the application may manage activation in a similar way. The application may revert to a wait state to detect other content upon determining the match using the other evaluation criteria.

The rule engine may process the content with the rule from the manifest. One or more rules may be retrieved from the manifest. The rule engine may use a logical AND or a logical OR to create a complex rule from multiple rules to process the content. In addition, if the rule engine detects a process timeout 330 while analyzing the content with the rule, the rule engine may make a record of the process timeout 332. The record may store information regarding status of the process analyzing the content with the rule. A process time may be evaluated against a predetermined timeout threshold. If the process time exceeds the predetermined time threshold, the rule engine may initiate a process timeout and stop rule based analysis of the content. The rule engine may also query for a number of prior process timeouts associated with the web extension, and store the number of prior process timeouts in the record. Additional actions that may be taken may include disabling a specific web extension and preventing its rules from being evaluated when there have been several prior timeouts. In addition, the application may revert to a wait state to detect other content.

The rule engine may copy the match into the memory 322 upon matching the rule to an item in the content. Access to the match in the memory may be provided to the web extension. A script of the web extension may be integrated with the match in the memory.

In addition, the application may display web extension user interface (UI) 324 in a device accessible to a user interacting with the content. An example web extension UI may be the web extension pane 208. An identifier for the associated web extension may be displayed in the web extension UI. A control button to activate the web extension UI may also be enabled adjacent to the web extension identifier. The application may await a user action to activate the control button of the associated web extension. After detecting an activation of the control button, the application may display the web extension within the web extension UI. A script of the web extension may also be executed in a sandbox environment to contain byproducts of the executed script within the sandbox.

The rule may be pre-defined and supported by a web extension framework. Furthermore, the rule may be received from a manifest of the web extension, a dynamic code provided by a developer for execution by a client application in order to determine activation, or a user built rule stored in a manifest of the web extension. In some embodiments, the rule may reference a dynamic list, and if the content matches an element of the dynamic list, the client application may be activated. The content may be an email message, a calendar item, or a contact item. In other embodiments, the rule may be a regular expression rule, and at least one pattern of the regular expression rule may be evaluated against a property of the content or an evaluation result of another rule.

The example scenarios and schemas in FIGS. 2 through 3 are shown with specific components, data types, and configurations. Embodiments are not limited to systems according to these example configurations. Providing a rule based analysis of a content to manage activation of a web extension may be implemented in configurations employing fewer or additional components in applications and user interfaces. Furthermore, the example schema and components shown in FIGS. 2 through 3B and their subcomponents may be implemented in a similar manner with other values using the principles described herein.

Figure 4:
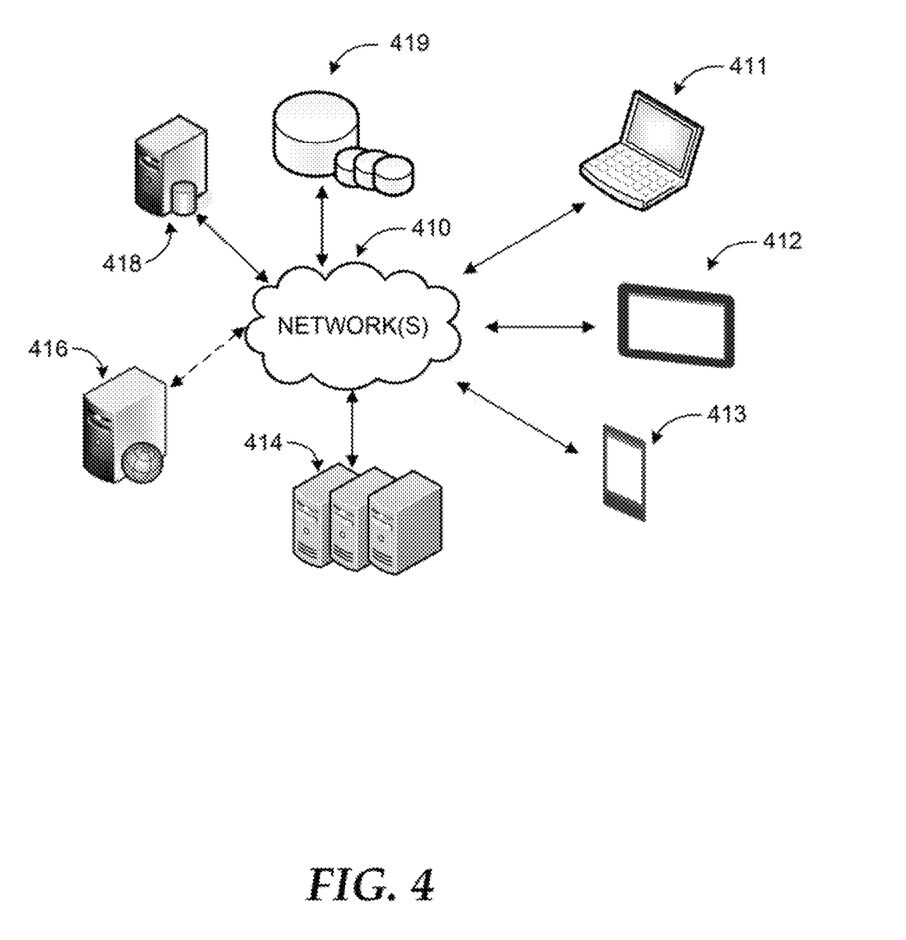
FIG. 4 is a networked environment, where a system according to embodiments may be implemented.

FIG. 4 is a networked environment, where a system according to embodiments may be implemented. Local and remote resources may be provided by One or more servers 414 or a single server (e.g. web server) 416 such as a hosted service. An application may execute on individual computing devices such as a smart phone 413, a tablet device 412, or a laptop computer 411 ('client devices') and communicate with customer and product information providers through network(s) 410.

As discussed above, an application may provide a rule based analysis of a content to manage activation of a web extension. The content may be analyzed with a rule from a manifest of a web extension. An activation control for the web extension may be displayed within a web extension pane upon determining a match from the analysis. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a rule based analysis of a content to manage activation of a web extension. Furthermore, the networked environments discussed in FIG. 4 are for illustration purposes only. Embodiments are not limited to the example applications, modules, or processes.

Figure 5:
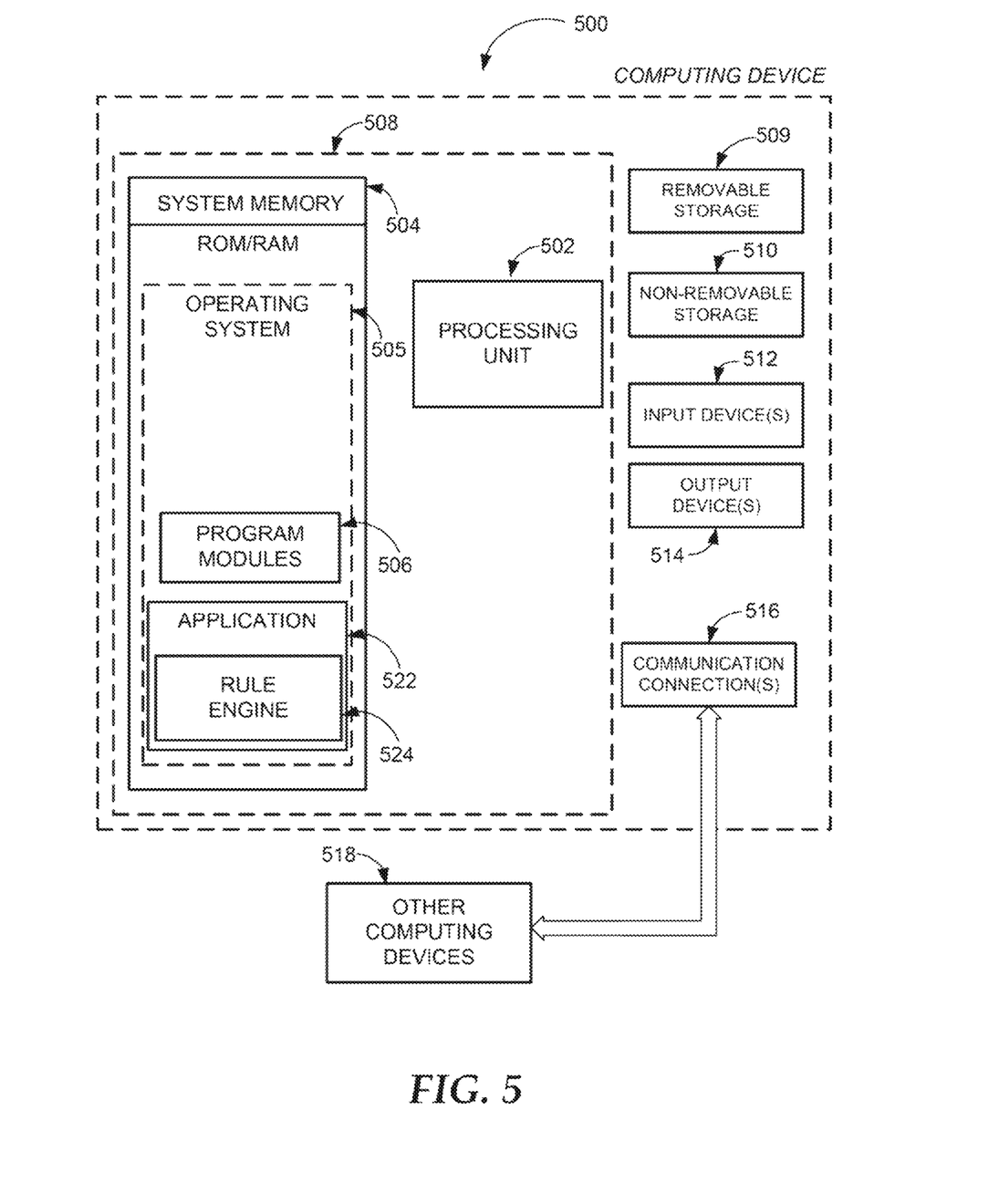
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory

504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, an application 522, and a rule engine 524.

The application 522 may provide rule based analysis of content to manage activation of a web extension according to embodiments. The application 522 may load a rule retrieved from a manifest of a web extension and content into memory. The rule engine 524 may process the content using the rule and by accessing the memory to determine a match in the content. The application 522 may display an activation control for the associated web extension within a web extension pane upon determining the match. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
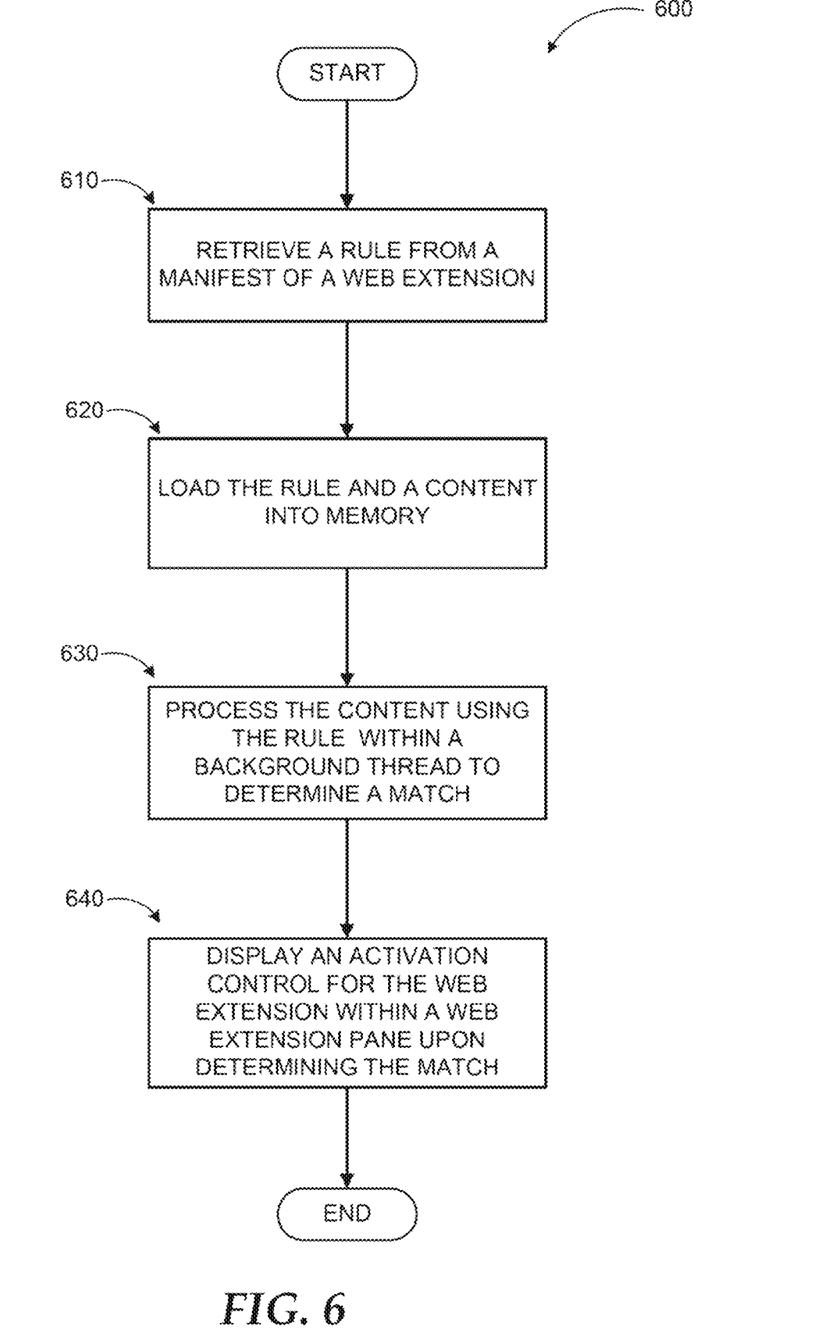
FIG. 6 illustrates a logic flow diagram for a process providing a rule based analysis of content to manage activation of a web extension according to embodiments.

FIG. 6 illustrates a logic flow diagram for a process providing a rule based analysis of a content to manage activation of a web extension according to embodiments. Process 600 may be implemented by an application in some examples.

Process 600 may begin with operation 610 where the application may retrieve a rule from a manifest of a web extension. The manifest may be formatted in XML and stored in cache, such as a memory cache or a disk cache. The rule and a content displayed to a user may be loaded into memory at operation 620. Content may be detected as a result of the user interacting with the content. At operation 630, the content may be processed for a match using the rule loaded from the manifest. Next, the application may display an activation control for the web extension within a web extension pane upon determining the match at operation 640. A copy of the match may be integrated into the web extension. The application may display an identifier for the integrated web extension adjacent to the activation control.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Providing a rule based analysis of a content to manage activation of a web extension according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing a rule based analysis of content to manage an activation of a web extension, the computing device comprising:
    a memory configured to store instructions; and
    a processor coupled to the memory, the processor executing an application in conjunction with the instructions stored in the memory, wherein the application is configured to:
        receive a manifest of the web extension;
        retrieve a rule from the manifest of the web extension:
        load the rule and the content into the memory;
        process the content with the rule in the memory to detect a match between the rule and the content; and
        display an activation control to execute the rule within a web extension pane in response to a detection of the match.

2. The computing device of claim 1, wherein the application is further configured to:
    detect a selection of the activation control; and
    display the web extension within a web extension user interface (UI).

3. The computing device of claim 1, wherein the application is further configured to:
    display the web extension pane in response to a detection of one or more of: an action interacting with the content, a selection action that selects a portion of the content, and a display action to display the content.

4. The computing device of claim 1, wherein the application is further configured to:
    detect the rule to reference a dynamic list; and
    process the content with the dynamic list to detect a match between an element of the dynamic list and the content.

5. The computing device of claim 1, wherein the application is further configured to:
    identify the rule to include a regular expression rule, wherein the regular expression rule describes a pattern within the content; and
    process the content with the regular expression rule to detect a match between the regular expression rule and the content.

6. The computing device of claim 5, wherein the application is further configured to:
    process one of: a property of the content and another rule from the manifest of the web extension with the pattern of the regular expression rule.

7. The computing device of claim 1, wherein the application is further configured to:
    access the manifest of the web extension to perform one or more of:
        alter the rule within the manifest;
        create a new manifest associated with the web extension, wherein the new manifest includes a new rule; and
        unlink the rule associated with the web extension in response to a deletion operation of the manifest.

8. The computing device of claim 1, wherein the application is further configured to:
    format the manifest using extensible markup language (XML);
    parse the manifest to translate the rule formatted in XML into conditions, wherein the conditions include one or more of a length of an item of the content, a substance of the item, and a matching frequency value of the item, and wherein the substance of the item includes alphanumeric characters of the item;
    process the conditions associated with the rule with the content to detect a match between an element of the conditions and the content; and
    store the manifest in a cache associated with the memory.

9. The computing device of claim 1, wherein the application is further configured to:
    format the manifest using extensible markup language (XML);
    parse the manifest to detect the rule formatted in XML, wherein the rule includes conditions;
    process the conditions associated with the rule with an item in the content to detect a match between an element of the conditions and the item in the content; and
    store the manifest in a cache associated with the memory.

10. The computing device of claim 1, wherein the application is further configured to:
    evaluate a process time for processing the content against a predetermined timeout threshold.

11. The computing device of claim 10, wherein the application is further configured to:
    detect the process time to exceed the predetermined timeout threshold; and
    initiate a process timeout.

12. The computing device of claim 11, wherein the application is further configured to:
    in response to a detection of an initiation of the process timeout, disable the web extension to prevent an execution of the rule.

13. A method executed on a computing device for providing a rule based analysis of content to manage an activation of a web extension, the method comprising:
    receiving a manifest of the web extension;
    retrieving a rule from the manifest of the web extension;
    loading the rule and the content into a memory of the computing device;
    processing the content with the rule in the memory to detect a match between the rule and the content;
    displaying an activation control to execute the rule within a web extension pane in response to a detection of the match; and
    displaying the web extension pane in response to one or more of: an action interacting with the content, a selection action that selects a portion of the content, and a display action to display the content.

14. The method of claim 13, further comprising:
    failing to detect the rule within the manifest; and
    in response to a failure to detect the rule within the manifest, processing the content using evaluation criteria included within the manifest.

15. The method of claim 14, further comprising:
    processing the content with the evaluation criteria to detect a match between the content and an element of the evaluation criteria; and
    reverting to a wait state to detect additional content.

16. The method of claim 13, further comprising:
    retrieving another rule from the manifest;
    creating a complex rule from the other rule by processing the other rule with one or more of: a logical AND and a logical OR.

17. A computer-readable memory device with instructions stored thereon to provide a rule based analysis of content to manage an activation of a web extension, the instructions comprising:
    receiving a manifest of the web extension;
    retrieving a rule from the manifest of the web extension;
    loading the rule and the content into a memory;

processing the content with the rule in the memory to detect a match between the rule and the content;
displaying an activation control to execute the rule within a web extension pane in response to a detection of the match; and
displaying the web extension pane in response to one or more of: an action interacting with the content, a selection action that selects a portion of the content, and a display action to display the content.

18. The computer-readable memory device of claim 17, wherein the instructions further comprise:
failing to detect rules within the manifest;
in response to a failure to detect the rules within the manifest, processing the content using evaluation criteria included within the manifest;
processing the content to detect a match between the content and an element of the evaluation criteria; and
reverting to a wait state to detect additional content.

19. The computer-readable memory device of claim 17, wherein the instructions further comprise:
identifying the rule to include a regular expression rule, wherein the regular expression rule describes a pattern within the content; and
processing the content with the regular expression rule to detect a match between the regular expression rule and the content.

20. The computer-readable memory device of claim 17, wherein the instructions further comprise:
retrieving another rule from the manifest;
creating a complex rule from the other rule by processing the other rule with one or more of: a logical AND and a logical OR.

* * * * *